United States Patent
Gallon et al.

(10) Patent No.: US 6,688,174 B1
(45) Date of Patent: Feb. 10, 2004

(54) ANTIVIBRATION ELASTIC SUSPENSION FOR INERTIAL MEASURING UNIT

(75) Inventors: Pierre Gallon, Vouneuil sur Vienne (FR); Jacques Cordonnier, Colombiers (FR)

(73) Assignee: Thomson-CSF Sextant, Velizy Villacoublay (FR)

(*) Notice: Subject to any disclaimer, the term of this patent is extended or adjusted under 35 U.S.C. 154(b) by 0 days.

(21) Appl. No.: 09/622,042
(22) PCT Filed: Dec. 17, 1999
(86) PCT No.: PCT/FR99/03189
§ 371 (c)(1), (2), (4) Date: Aug. 23, 2000
(87) PCT Pub. No.: WO00/39526
PCT Pub. Date: Jul. 6, 2000

(30) Foreign Application Priority Data

Dec. 23, 1998 (FR) ............................................. 98 16356

(51) Int. Cl.⁷ ................................................ G01P 1/02
(52) U.S. Cl. ................................................ 73/493
(58) Field of Search .................... 73/514.01, 514.08, 73/514.02, 514.14, 514.15, 514.16, 504.08, 504.13, 504.12, 432.1, 493, 431; 310/332; 374/94; 356/459

(56) References Cited

U.S. PATENT DOCUMENTS

| | | | | |
|---|---|---|---|---|
| 4,099,696 A | * | 7/1978 | Toome | ................... 248/624 |
| 4,477,188 A | * | 10/1984 | Stiles et al. | ................... 356/471 |
| 4,711,575 A | * | 12/1987 | Butler | ................... 356/476 |
| 4,744,249 A | * | 5/1988 | Stewart | ................... 73/504.04 |
| 5,233,406 A | * | 8/1993 | Platt et al. | ................... 356/476 |
| 5,394,241 A | * | 2/1995 | Geen | ................... 356/471 |
| 5,940,179 A | * | 8/1999 | Jaulain et al. | ................... 356/471 |
| 6,069,699 A | * | 5/2000 | Hemery et al. | ................... 356/459 |

FOREIGN PATENT DOCUMENTS

| | | |
|---|---|---|
| FR | 2 759 160 | 8/1998 |
| WO | WO 86/00984 | 2/1986 |

* cited by examiner

*Primary Examiner*—Hezron Williams
*Assistant Examiner*—Tamiko Bellamy
(74) *Attorney, Agent, or Firm*—Oblon, Spivak, McClelland, Maier & Neustadt, P.C.

(57) ABSTRACT

An antivibration elastic suspension in which a chassis of an inertial measurement unit is placed inside a casing. The inertial measurement unit includes a gyro assembly that is fixed to the chassis by two support rings flexible in terms of torsion and rotation around a fixed axis of the chassis. At least one flexible annular diaphragm is coaxial with the fixed axis and the flexible annular diaphragm is fixed by an interior periphery to an exterior periphery of the chassis and by an exterior periphery to an interior wall of the casing. The flexible annular diaphragm respects a symmetry of revolution exhibited by the gyro assembly with respect to the fixed axis.

20 Claims, 4 Drawing Sheets

ANTIVIBRATION ELASTIC SUSPENSION FOR INERTIAL MEASURING UNIT

Figure 1:
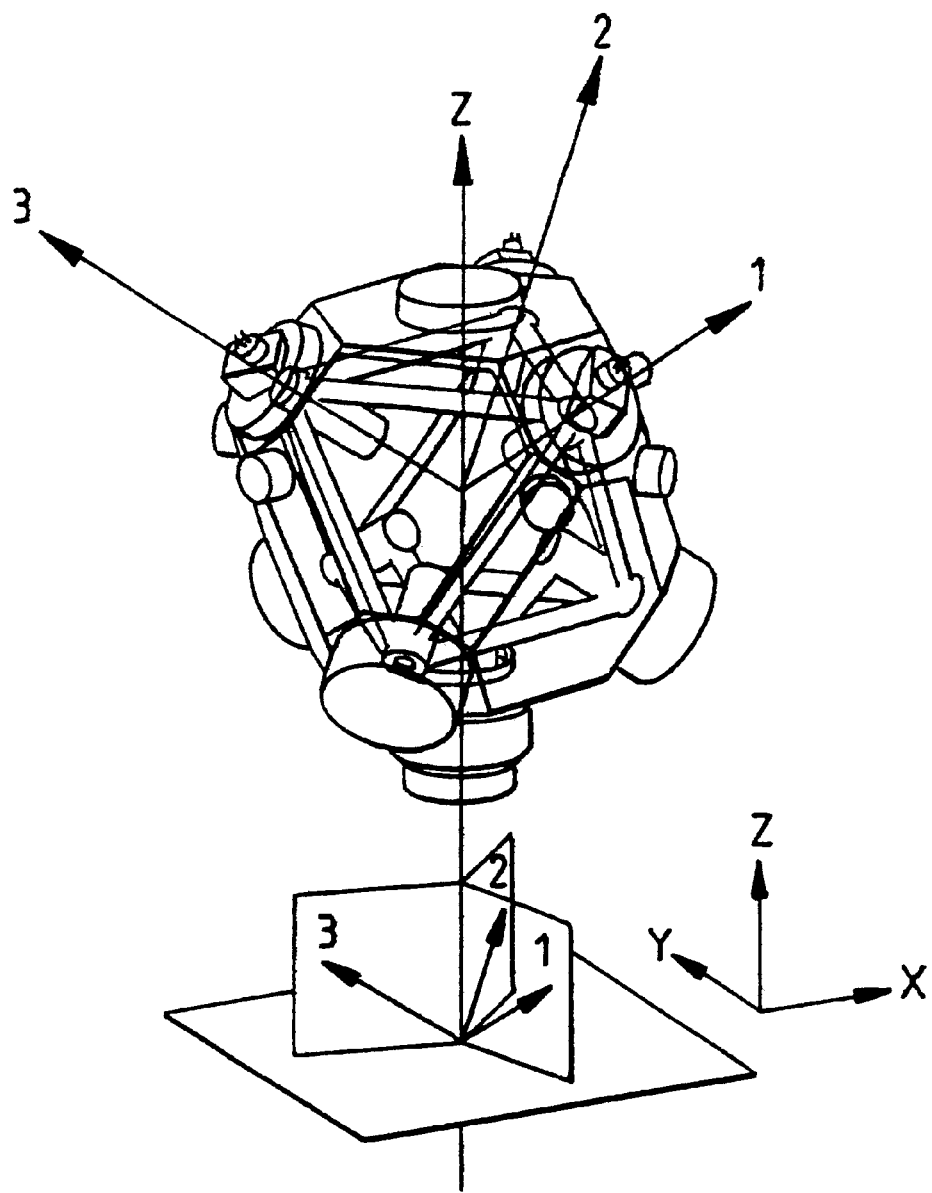

The present invention relates to units for inertial measurement of movement, more specifically although not exclusively intended to be incorporated into laser gyro inertial systems activated by mechanical vibrations and intended to be fitted in aircraft.

These inertial measurement units have, when mounted on moving bodies, to be protected by dampers from the parasitic mechanical influences of the vibration or jolt type so that such influences do not disrupt their operation and cause the least possible amount of noise in their measurement signals; although, to a certain extent, it is possible to combat the noise that affects the measurement signals of an inertial system as a result of parasitic mechanical influences using digital processing, this is costly in terms of computation power which means that every attempt is made to reduce the parasitic mechanical influences as far as possible.

To achieve this, it is commonplace for the sensors of an inertial measurement unit: gyros and accelerometers, to be mounted on or in a support chassis which is both rigid and lightweight, suspended inside a casing via a small number of elastic damping pads.

When the gyros are laser gyros, a further problem arises as a result of the use, for combating their lack of sensitivity at low rotational speeds, of a mechanical activation which, by reaction, gives rise to parasitic movements of the casing.

Specifically, the principle of a single-axis laser gyro is based on the use of two monochromatic light beams propagating in opposite directions in a plane along the same path in a closed loop. When the plane of the path of the two counter-propagating monochromatic light beams is rotated with respect to its normal, the effective lengths of the paths travelled by the two beams change, leading to a difference in frequency between the two beams because the frequency of oscillation of a laser is dependent upon the length of the path travelled by its beam. This difference in frequency, which can be measured by making the two beams interfere on a photodetector, then gives a measurement of the speed at which the plane of the path of the two light beams is rotating about its normal, which is the sensitive axis of the gyro. However, when the difference in path length of the two beams is small, the two light beams couple and oscillate at one and the same frequency, which means that it is impossible to measure low rotational speeds. To alleviate this lack of sensitivity of single-axis laser gyros at low rotational speeds, it is known practice for them to be given an oscillatory vibratory mechanical movement about their sensitive axis so as to increase their apparent speed of rotation and allow small speeds of rotation to be measured. The offset on the rotational measurement produced by this auxiliary mechanical vibratory movement is eliminated later by appropriate processing of the signal supplied by the gyro.

Three-axis laser gyros consist of an assembly, in a rigid block, of three single-axis laser gyros with their sensitive axes oriented along the three axes of a trihedron involving three right angles and, possibly, common elements. To overcome their lack of sensitivity at low rotational speeds, they are activated by a single oscillatory vibratory mechanical movement about an axis which is oriented differently from their sensitive axes, in a direction such that this movement has oscillatory components of like amplitude about the three sensitive axes of the three single-axis laser gyros.

The vibratory mechanical activating movement is obtained, in general, by mounting the rigid block consisting of the three three-axis laser gyros, known as the three-axis laser gyro assembly between two support rings which are spaced out along and centred on its axis of activation and have a certain degree of flexibility in terms of torsion and in terms of rotation. These support rings are attached rigidly by their hub or interior wall, to the three-axis gyro assembly. They act as insert pieces which, via their rim, or exterior periphery, contact a cylindrical sleeve which surrounds the three-axis laser gyro assembly and acts as a chassis supporting both the three-axis laser gyro assembly and the accelerometer sensors of the inertial measurement unit. The two support rings are fixed by their rim or exterior periphery to the interior wall of the cylindrical sleeve. One of them is fitted with a piezoelectric oscillatory motor for generating and sustaining the activating rotary oscillations. The cylindrical sleeve containing the three-axis laser gyro assembly and supporting the accelerometers is itself placed in a casing and attached to the interior wall thereof via a number of elastic damping pads spread uniformly about its periphery.

Of the parasitic mechanical influences to which laser gyros are sensitive, the most troublesome are those which give rise to conical movements of the gyros, combining rotations about directions transverse to their sensitive axes. Some of these conical movements originate from external disturbances transmitted to the laser gyro assembly by the casing, the suspension consisting of the elastic damping pads and the support rings which are flexible in terms of torsion and in terms of rotation; they manifest themselves more particularly at the frequency of the suspension, which is a low frequency of the order of some tens of hertz. However, others have their origins in the reaction of the casing to the mechanical activating movement transmitted to the laser gyro assembly via the suspension and the support rings. These manifest themselves at the activating frequency which is of the order of several hundreds of hertz.

To combat noise in the signals delivered by the gyros and which originate from the parasitic conical movements, it is commonplace for error compensation, compensating for the errors due to the conical movements, to be introduced by detecting these movements, estimating the influence they have on the gyro signals and digitally processing the gyro signals to compensate for these influences.

However, the parasitic conical movements at the activating frequency cannot be estimated and compensated for correctly by the customary digital processing operations because their frequency is too high. Attempts could be made at pushing back the frequency limit on compensatory digital processing operations, but this would entail the use of analogue/digital converters and a processing unit which perform far better than those currently used.

Another approach would be to take as many steps as possible to attenuate these parasitic conical movements at the activating frequency which are the root cause of troublesome residual noise and of very-low-frequency drift in the signals from the gyros. As these are transmitted to the gyros through their damped suspension, this is one possible line of approach. However, it would seem that the current way that gyros are suspended in their casings by elastic damping pads is not optimum because of the dissymmetry in the damping characteristics about the axis of activation which are caused by inevitable differences in stiffness between the elastic damping pads and which are the root cause of couplings between axes that encourage the parasitic conical movements to be transmitted to the gyro assembly.

The object of the present invention is to reduce the parasitic conical movements to which laser gyros with mechanical activating movement are subjected, in order to reduce the residual noise and the very-low-frequency drift that affects their signals, and to do so by improving the symmetry of the suspension of a gyro with respect to its axis of activation in order to reduce the amplitude of the transverse movements through coupling of the various degrees of freedom.

The subject of the present invention is an antivibration elastic suspension designed for attaching the chassis of an inertial measurement unit to the inside of a casing, a gyro assembly with a mechanical activating movement being fixed into the said chassis via two support rings which are flexible in terms of torsion and in terms of rotation, spaced along the chassis and centred along the axis of activation of the gyro assembly. This antivibration elastic suspension is noteworthy in that it comprises at least one flexible annular diaphragm arranged so that it is coaxial with the axis of activation of the gyro assembly and fixed by its interior periphery to the exterior periphery of the chassis and by its exterior periphery to the interior wall of the casing.

Advantageously, the said flexible annular diaphragm is a flat diaphragm.

Advantageously, the said flexible annular diaphragm is fixed to the exterior periphery of the chassis of the inertial measurement unit by trapping its interior edge between a fixing ring secured to the exterior periphery of the chassis and a clamping washer attached to the said fixing ring.

Advantageously, the said flexible annular diaphragm is fixed inside a rigid frame secured to the casing by trapping its exterior edge between the said frame and a clamping washer attached to the said rigid frame.

Advantageously, the said flexible annular diaphragm is made of a moulded flexible material, reinforced at its interior and exterior edges by two rigid hoops incorporated into the mass of the moulded material and pierced with screw-fastening orifices.

Advantageously, the said flexible annular diaphragm is made of a flexible plastic.

Advantageously, the said flexible annular diaphragm is made of a rubbery material.

Advantageously, this antivibration elastic suspension comprises two flexible annular diaphragms centred on the axis of activation of the laser gyro assembly and arranged so that they are spaced out along the height of the exterior wall of the chassis, each of these two flexible annular diaphragms being fixed by its interior edge to the exterior wall of the chassis and by its exterior edge to the interior wall of the casing.

Advantageously, the casing of the inertial measurement unit is cylindrical and comprises, on the inside, near its two ends, annular plates to which the flexible annular diaphragms of the antivibration elastic suspension are fixed.

Advantageously, the laser gyro assembly is fixed, in the inertial measurement unit, inside a cylindrical chassis, by means of at least one support ring which is placed at a top of the cylindrical chassis, and the exterior periphery of which is accessible from outside the cylindrical chassis and equipped with attachment means allowing the interior edge of a flexible annular diaphragm of the antivibration elastic suspension to be fixed to it.

This elastic suspension using diaphragms is far better at respecting symmetry with respect to the axis of activation of the laser gyro than an elastic suspension using a small number of isolated damping shoes. It thus makes it possible to reduce the couplings of axes to a great extent and therefore to reduce the amplitudes of the transverse parasitic movements caused by the reaction of the casing to the activating oscillations.

Figure 2:
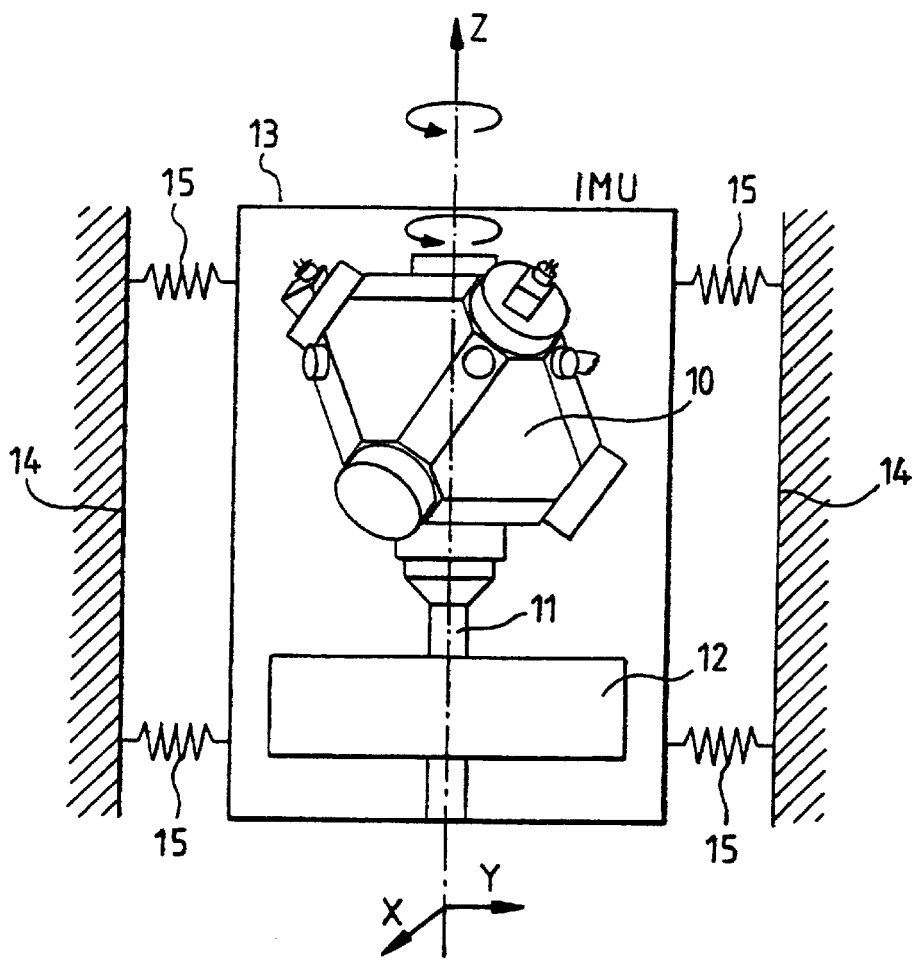
Figure 3:
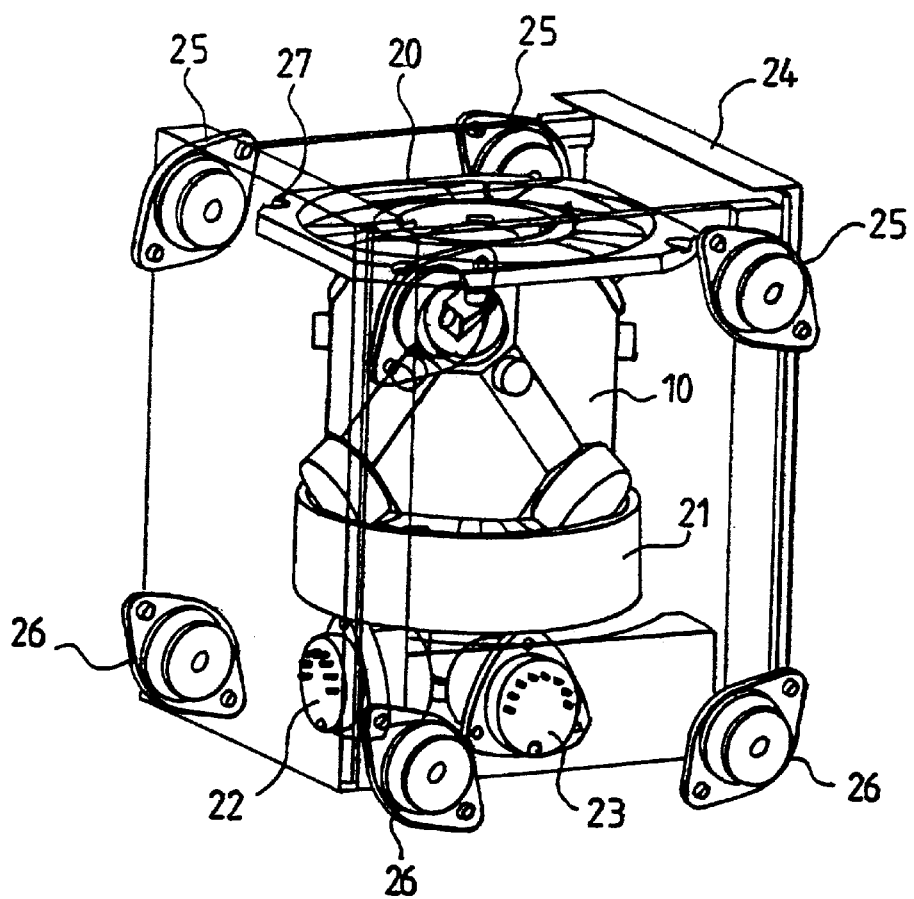
Figure 4:
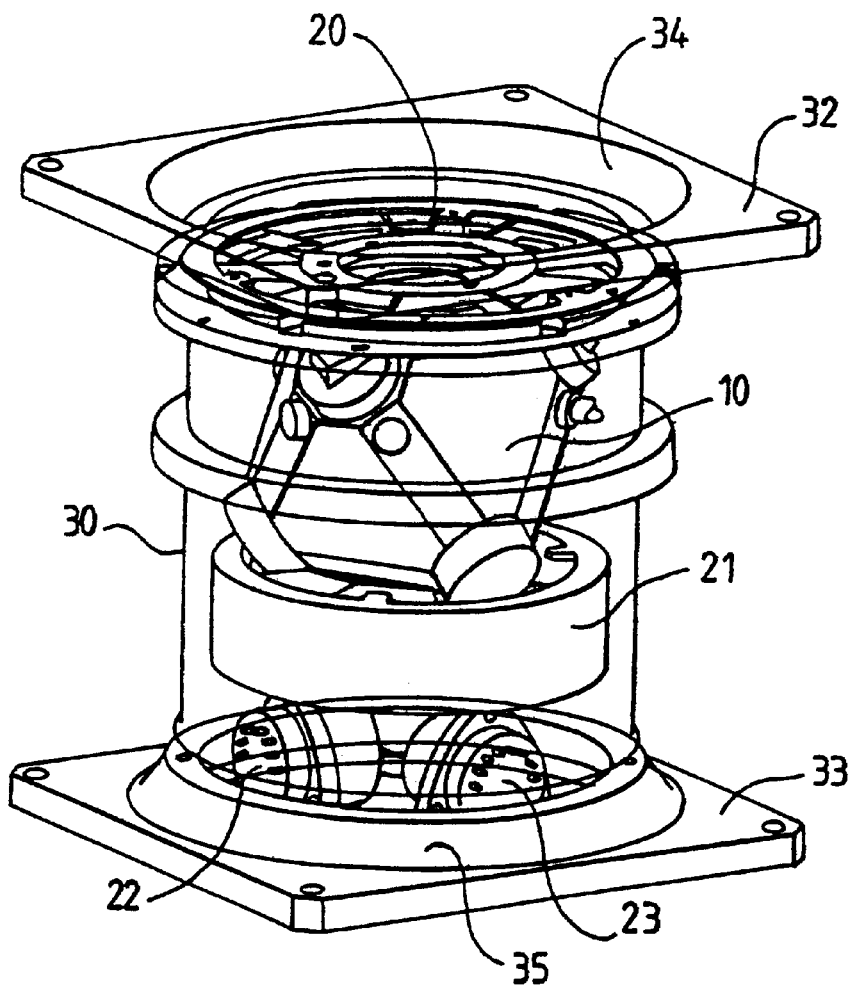

Other features and advantages of the invention will become apparent from the description hereinafter of one embodiment which is given by way of example. This description will be given with reference to the drawing, in which:

FIG. 1 is a perspective view showing the external appearance of a three-axis laser gyro assembly, FIG. 2 is a functional diagram illustrating the mechanical mounting of an inertial measurement unit equipped with a three-axis laser gyro assembly in such a way as to allow an activating movement while at the same time damping the parasitic mechanical influences applied to the inertial measurement unit, FIG. 3 is a perspective and "transparent" view of an inertial measurement system with a threeaxis laser gyro assembly and mechanical activation, mounted in a hollow cylindrical chassis itself fixed in a casing by means of an antivibration elastic suspension of the state of the art, and FIG. 4 is a perspective and "transparent" view of an inertial measurement unit with a mechanically activated three-axis laser gyro assembly, mounted in a hollow cylindrical chassis itself fixed in a casing by means of an antivibration elastic suspension of the invention.

FIG. 1 shows the appearance of a conventional three-axis laser gyro assembly. This essentially consists of a block of glass in which passages have been bored to delimit three closed quadrilateral-shaped paths in three orthogonal planes, which paths are intended to be covered by the contrapropagating laser beams. To save on parts (to reduce the number of simple reflection mirrors and mobile laser beam path length control mirrors), the three quadrilateral-shaped paths have corners shared by two paths. This leads to a three-axis laser gyro assembly 10 in the overall shape of a cube with cut-off corners. For further details on this kind of three-axis laser gyro assembly, reference can be made to French Patent FR 2 512 198. What is important as far as the remainder of the description is concerned is that the activating movement needed to alleviate the effect of the lack of sensitivity of the three laser gyros with orthogonal axes of sensitivity all combined into the same assembly 10 is an oscillatory movement in rotation about an axis Z which makes three angles of the same size with respect to the three orthogonal sensitive axes 1, 2, 3 of the three gyros.

FIG. 2 gives a functional diagram of the mounting of a three-axis laser gyro assembly so as to allow mechanical activation consisting in an oscillatory rotational movement of the three-axis laser gyro assembly about a fixed axis Z while at the same time damping out the parasitic mechanical excitations transmitted to the three-axis laser gyro assembly by its carrier to the greatest possible extent.

To obtain the activating movement, the laser gyro assembly has to be subjected to the action of an aoscillating rotary motor. This has been depicted diagrammatically in FIG. 2 by showing the gyro assembly 10 mounted on a drive shaft 11 coincident with the axis of activation Z and driven by an oscillatory rotary motor 12 itself fixed to a chassis 13. The damping of the parasitic mechanical excitations originating from the carrier 14 is depicted diagrammatically in FIG. 2 by attaching the chassis 13 to the carrier 14 via dampers 15.

In the current state of the art, the requirements regarding freedom of oscillation in terms of rotation about the axis of activation of the laser gyro assembly and the damping of parasitic mechanical excitations originating from the carrier are solved by adopting the architecture depicted in FIG. 3. The laser gyro assembly 10 is recognizable in this FIG. 3. It is mounted between two support rings 20, 21 with the same axis, centred on the axis of activation Z. These support rings 20, 21 have a certain flexibility in terms of torsion and in terms of rotation so as to leave the laser gyro assembly 10 a certain degree of freedom of movement about its activation axis. In general, they are in the shape of a spoked wheel with a hub held at the centre of a rim by flexible radial leaves which are arranged in transverse planes and uniformly spaced around the hub, and which act as springs. One of them, 21, is equipped with a piezoelectric motor and constitutes the oscillatory rotary motor that provides the activating movement.

The piezoelectric motor consists of pairs of piezoelectric ceramic plates which are equipped on their flanks with excitation electrodes and are bonded opposite each other onto a number of radial leaves that secure the hub to the rim of the support ring 21. These pairs of piezoelectric plates, when appropriately energized by an electrical voltage, give rise to a kind of bimetallic-strip effect on the radial leaves which, when repetitive, gives rise to rotary oscillations between the hub and the rim of the support ring 21.

With respect to the functional diagram of FIG. 3, the drive shaft of the activating motor is omitted, making it possible to avoid parasitic movements due to undesired bending of the shaft, and also making it possible to obtain a more compact set-up.

The laser gyro assembly 10 is fixed by its two support rings 20 and 21 inside a rigid cylindrical sleeve which is not depicted in FIG. 3 in order to leave the gyro assembly and its support rings visible. This rigid cylindrical sleeve acts as a chassis for the inertial measurement unit and in addition to supporting the laser gyro assembly 10 also supports accelerometer sensors 22, 23. It is placed in a casing 24 and fixed to the latter by damping pads which are also distributed around its periphery. The damping pads, of which there are eight, are split into two groups of four 25, 26. One 25 of the groups of damping pads rests against the top of the cylindrical barrel, on the exterior periphery of the support ring 20 secured to the said cylindrical barrel and which has fixing lugs 27 which protrude beyond the latter, while the other group of damping pads bears against the base of the cylindrical barrel, on fixing lugs which are not visible in FIG. 3.

This antivibration elastic suspension has the drawback of allowing mechanical, vibrations, that are the result of the reaction of the casing of the inertial measurement unit to the activating movement, to reach the laser gyro assembly and give rise to parasitic conical movements at the frequency of the activating movement, these parasitic movements being responsible both for background noise on signals which is delivered by the gyro and is not correctly eliminated by the low-pass filtering, and also for drift at very low frequency.

To combat this drawback, it has been proposed that the antivibration elastic suspension be modified in accordance with FIG. 4.

FIG. 4 shows the gyro assembly 10 with its two support rings 20, 21, viewed "transparently" through the rigid cylindrical sleeve 30 which acts as a chassis for the inertial measurement unit. As mentioned earlier, this rigid cylindrical sleeve 30 supports not only the laser gyro assembly 10, via its support rings 20, 21, but also some accelerometer sensors 22, 23. The casing of the inertial measurement unit is not shown in this FIG. 4, for reasons of clarity. It is simply represented by two fixing frames 32 and 33, which form part of it and which are placed opposite each other, one of them, 32, at its top, and the other, 33, at its base, with their circular openings centred on the axis of activation of the laser gyro assembly 10. These fixing frames 32, 33, which are secured to the casing, have a central opening of a diameter slightly greater than that of the rigid cylindrical sleeve 30. They are used for anchoring, inside the casing, by means of an annular antivibration elastic suspension, the rigid cylindrical sleeve 30 that supports the laser gyro assembly 10 and the accelerometer sensors 22, 23.

The annular antivibration elastic suspension consists of two flexible annular diaphragms 34, 35 joining the peripheries of the interior openings of the fixing frames 32, 33 of the casing to the exterior peripheries of the top and base of the rigid cylindrical sleeve 30.

Each annular flexible diaphragm 34 may be provided, on its exterior periphery and equally on its interior periphery, with a rigid hoop which allows the diaphragm to maintain its circular shape and makes it easier to mount. This rigid hoop may be incorporated into the mass of flexible material of which the diaphragm is made or attached and bonded to it. It is pierced with screwing orifices distributed uniformly around its periphery, allowing the edge of the flexible diaphragm it stiffens to be fixed easily, by screwing, to the interior periphery of the opening of a fixing frame 32 of the casing, in the case of a rigid hoop with which the exterior edge of an annular flexible diaphragm is equipped, or to the exterior periphery of the top or base of the hollow cylindrical sleeve 30 which acts as a chassis, in the case of a rigid hoop with which the interior edge of the flexible diaphragm is equipped.

The flexible diaphragms are preferably flat for ease of manufacture, but may just as well be of non-planar shapes, while at the same time maintaining symmetry of revolution. They are made, for example, of a plastic or rubber. They may be obtained by moulding or by cutting from sheet material. In general, their manufacture uses the same technology as the manufacture of flexible gaskets, although particular attention has to be given to the choice of material of which they are made, to ensure that they have good resistance to ageing and that they are not, in the long-term, likely to craze as a result of the shear forces they experience on account of the activating movement.

The annular flexible diaphragm 34 that attaches the exterior periphery of the top of the hollow cylindrical sleeve 30 acting as a chassis to the interior periphery of the opening of the fixing frame 32 of the casing may also be fixed by its interior edge to a cover that closes off the upper face of the cylindrical hollow sleeve 30 acting as a chassis and covers the support ring 20. However, it is also possible for the interior edge of this annular flexible diaphragm 34 to be fixed to the exterior periphery of the fixing ring 20 which is mechanically secured to the hollow cylindrical sleeve 30, provided, of course, that the said exterior periphery is accessible from outside the hollow cylindrical sleeve. It is also possible, at the exterior periphery of the hollow cylindrical sleeve 30 acting as a chassis, to provide fixing rings specially designed for attaching the flexible annular diaphragms of the suspension.

This kind of antivibration elastic suspension with two annular flexible diaphragms placed one on each side of the hollow cylindrical sleeve containing a mechanically activated laser gyro assembly and centred on the axis of activation of the laser gyro assembly, respects the symmetry of revolution exhibited by the laser gyro assembly with respect to its axis of activation far more fully than the antivibration elastic suspension with elastic blocks of the prior art, because of the great homogeneity of the elasticity properties of a diaphragm in all directions of its plane. This better respect of symmetry with respect to the axis of activation leads to far weaker mechanical couplings between the sensitive axes of the laser gyro assembly, leading to virtual elimination of conical movements at the frequency of the activating oscillations and therefore to a reduction in residual noise and drift that affects the gyro signals.

What is claimed is:

1. An antivibration elastic suspension configured to attach a chassis of an inertial measurement unit to an inside of a casing, the inertial measurement unit comprising a gyro assembly configured to oscillatory rotate around a longitudinal fixed axis of the chassis and fixed into the chassis by two support rings flexible in terms of torsion and rotation, which are spaced along the chassis and centred along the fixed axis, said antivibration elastic suspension comprising:

at least one flexible annular diaphragm configured to be coaxial with the fixed axis and fixed by an interior periphery to an exterior periphery of the chassis and by an exterior periphery to an interior wall of the casing.

2. The suspension according to claim 1, wherein said flexible annular diaphragm is a flat diaphragm.

3. The suspension according to claim 1, wherein said flexible annular diaphragm is fixed to the exterior periphery of the chassis of the inertial measurement unit by trapping its interior edge between a fixing ring secured to the exterior periphery of the cylindrical chassis and a clamping washer attached to said fixing ring.

4. The suspension according to claim 1, wherein said flexible annular diaphragm is fixed inside a rigid frame secured to the casing by trapping an exterior edge of said flexible annular diaphragm between said rigid frame and a clamping washer attached to said rigid frame.

5. The suspension according to claim 1, wherein said flexible annular diaphragm is made of a moulded flexible material, reinforced at its interior and exterior edges by two rigid hoops incorporated into a mass of the moulded material and pierced with screw-fastening orifices.

6. The suspension according to claim 1, wherein said flexible annular diaphragm is made of a flexible plastic.

7. The suspension according to claim 1, wherein said flexible annular diaphragm is made of a rubbery material.

8. The suspension according to claim 1, further comprising a second flexible annular diaphragm centred on the fixed axis and arranged so that the two annular diaphragms are spaced out along a height of an exterior wall of the chassis, each of the two flexible annular diaphragms being fixed by their interior edge to an exterior wall of the chassis and by their exterior edge to the interior wall of the casing.

9. The suspension according to claim 1, wherein the casing of the inertial measurement unit is cylindrical and comprises, on an inside, near its two ends, frames which are centred on the fixed axis and to which edges of the exterior periphery of the flexible annular diaphragm is fixed.

10. The suspension according to claim 1, wherein the laser gyro assembly is fixed inside a cylindrical chassis by at least one support ring which is placed at a top of the cylindrical chassis, an exterior periphery of said support ring is accessible from outside the cylindrical chassis, and an exterior periphery of said support ring is equipped with attachments allowing an interior edgeof the flexible annular diaphragm to be fixed to said attachments.

11. An antivibration elastic suspension configured to attach a chassis of inertial measurement means to an inside of a casing, the inertial measurement means comprising gyro means for oscillatory rotating around a longitudinal fixed axis of the chassis, the gyro means fixed to the chassis by two support means flexible in terms of torsion and rotation, which are spaced along the chassis and centred along the fixed axis, said antivibration elastic suspension comprising:

at least one flexible annular diaphragm means for flexibly anchoring the chassis to the casing, being coaxial with the fixed axis and fixed by an interior periphery to an exterior periphery of the chassis and by an exterior periphery to an interior wall of the casing.

12. The suspension according to claim 11, wherein said flexible annular diaphragm means is a flat diaphragm means.

13. The suspension according to claim 11, wherein said flexible annular diaphragm means is fixed to the exterior periphery of the chassis of the inertial measurement means by trapping its interior edge between fixing means secured to the exterior periphery of the cylindrical chassis and clamping means attached to said fixing means.

14. The suspension according to claim 11, wherein said flexible annular diaphragm means is fixed inside frame means secured to the casing by trapping an exterior edge of said flexible annular diaphragm means between said frame means and clamping means attached to said frame means.

15. The suspension according to claim 11, wherein said flexible annular diaphragm means is made of a moulded flexible material, reinforced at its interior and exterior edges by two hoops means incorporated into a mass of the moulded material and pierced with fastening means.

16. The suspension according to claim 11, wherein said flexible annular diaphragm means is made of flexible plastic means.

17. The suspension according to claim 11, wherein said flexible annular diaphragm means is made of rubbery means.

18. The suspension according to claim 11, further comprising a second flexible annular diaphragm means for flexibly anchoring the chassis to the casing, the second flexible annular diaphragm means is centred on the fixed axis, wherein the two annular diaphragms means are spaced out along a height of an exterior wall of the chassis, and each of the two flexible annular diaphragms means are fixed by their interior edge to an exterior wall of the chassis and by their exterior edge to the interior wall of the casing.

19. The suspension according to claim 11, wherein the casing of the inertial measurement means is cylindrical and comprises, on an inside, near its two ends, frame means for fixing edges of the exterior periphery of the flexible annular diaphragm means, centred on the fixed axis.

20. The suspension according to claim 11, wherein the gyro means is fixed inside a cylindrical chassis by at least one support means that is placed at a top of the cylindrical chassis, an exterior periphery of said support means is accessible from outside the cylindrical chassis, and an exterior periphery of said support means is equipped with attachment means for allowing an interior edge of the flexible annular diaphragm means to be fixed to said attachment means.

* * * * *